United States Patent [19]

Garcia

[11] 4,023,415

[45] May 17, 1977

[54] PRESSURE MONITORING DEVICE

[75] Inventor: George E. Garcia, Tiburon, Calif.

[73] Assignees: G. E. Garcia; P. C. Jackson; T. G. Spragg; S. A. Childs; Edwin W. Randle; Thelma H. Randle; James G. Shields, all of Tiburon, Calif.; part interest to each

[22] Filed: Sept. 22, 1975

[21] Appl. No.: 615,730

Related U.S. Application Data

[63] Continuation-in-part of Ser. No. 462,081, April 18, 1974, abandoned.

[52] U.S. Cl. .............................. 73/410; 73/398 R; 73/419; 137/493.1; 200/83 N
[51] Int. Cl.² .......................................... G01L 7/06
[58] Field of Search .......... 73/146.3, 146.4, 146.5, 73/196, 410, 419, 409, 398 R, 406; 280/150 AB; 340/58; 200/61.25, 83 N, 83 C, 83 Q, 83 W; 92/5 R, 34; 137/493.1, 493.3, 493.6

[56] References Cited

UNITED STATES PATENTS

| 2,554,594 | 5/1951 | Shea ..................... 340/58 |
| 3,252,135 | 5/1966 | Amundsen, Jr. ..................... 340/58 |
| 3,332,287 | 7/1967 | Amen ..................... 73/419 |

Primary Examiner—Donald O. Woodiel
Attorney, Agent, or Firm—Owen, Wickersham & Erickson

[57] ABSTRACT

An actuator device responsive to a pressure variation in its surrounding environment comprises a wall structure forming a small chamber having a pressure activated inlet check valve that allows fluid to flow into the chamber. One wall portion of the device is movable to an extendable position when pressure within the chamber exceeds the outside pressure.

12 Claims, 17 Drawing Figures

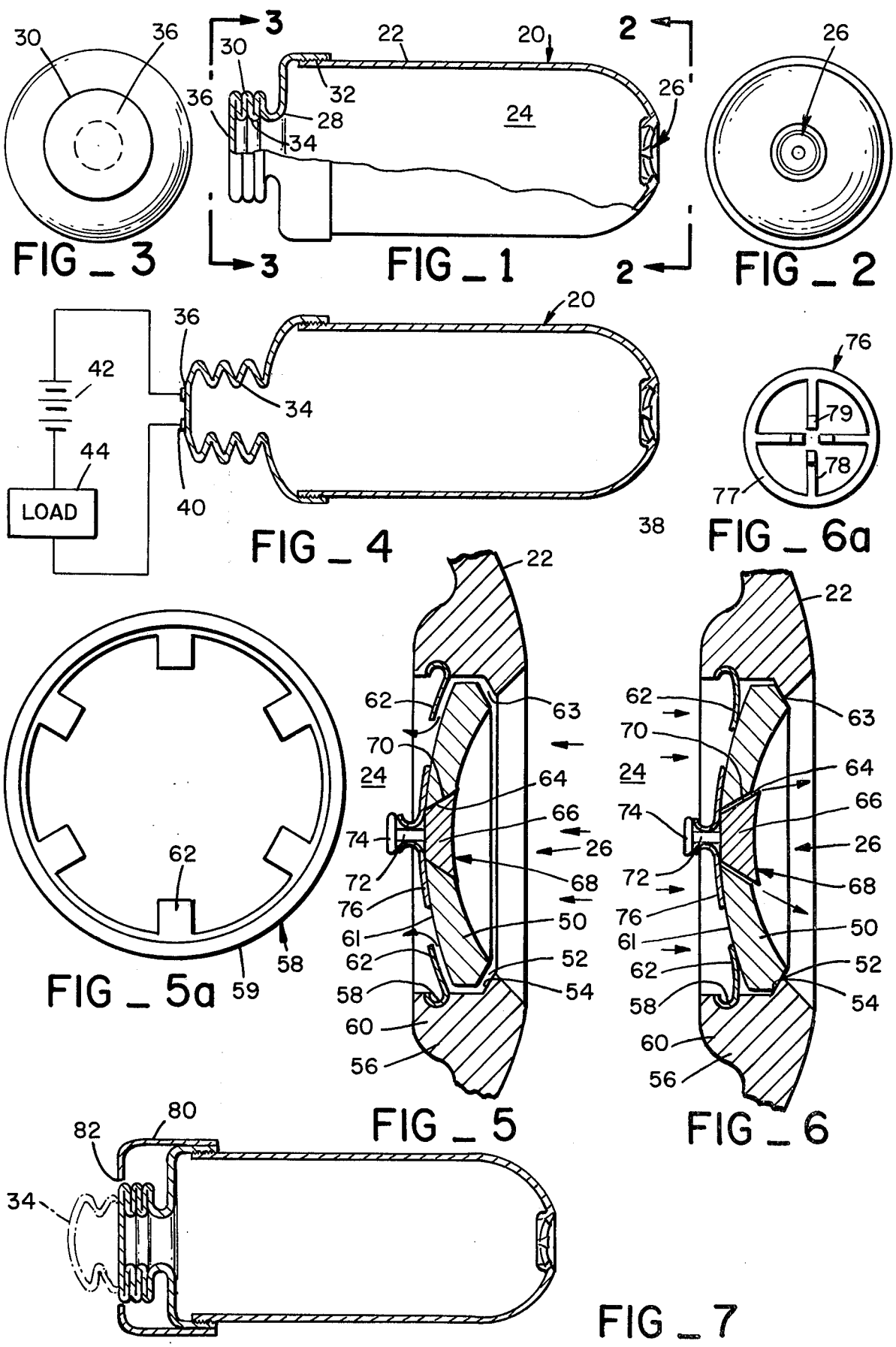

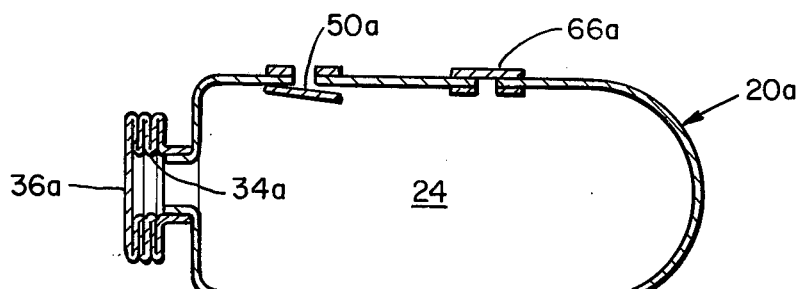
FIG_8
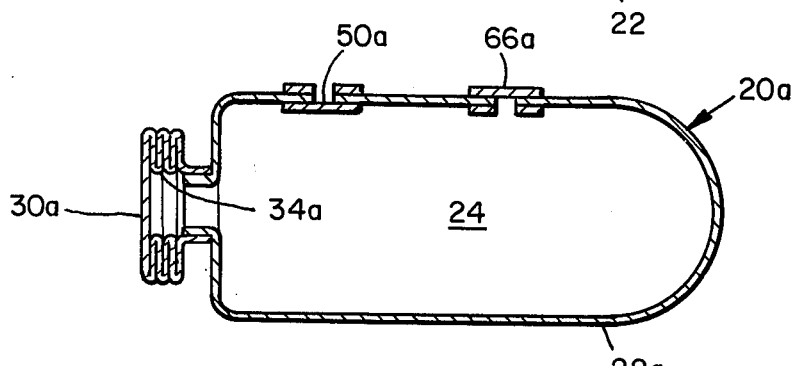
FIG_9
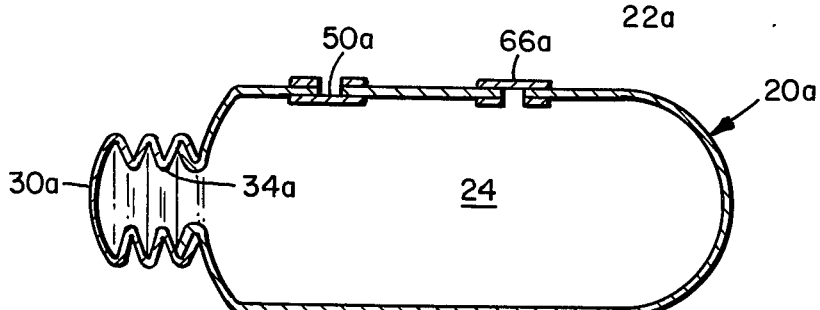
FIG_10
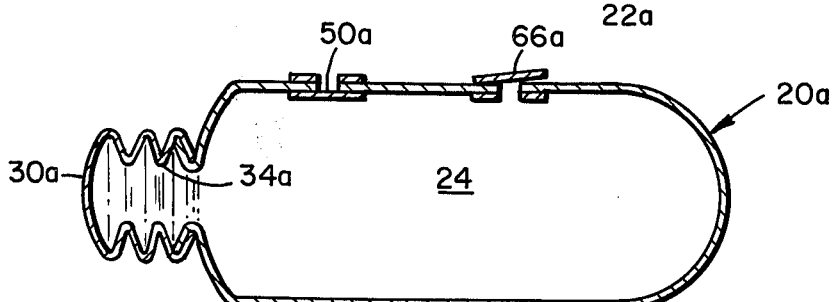
FIG_11
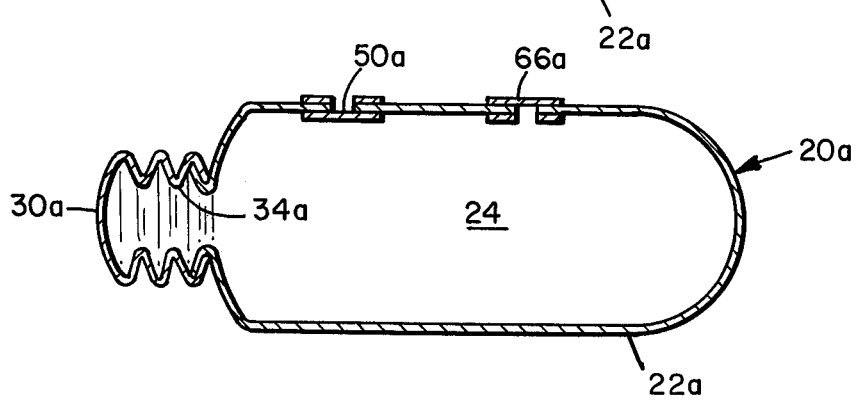
FIG_12

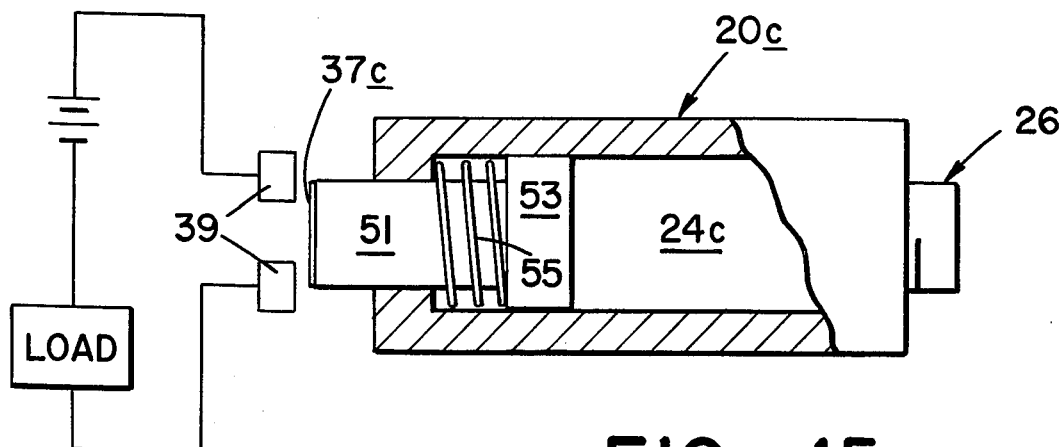
FIG_15
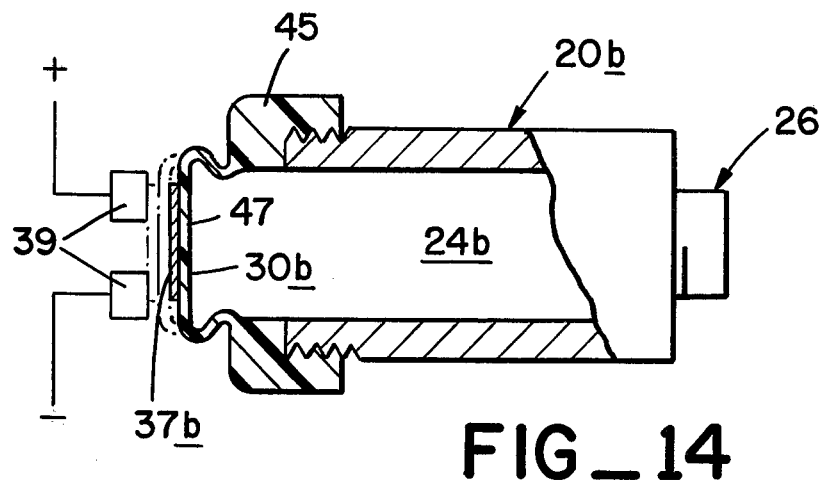
FIG_14
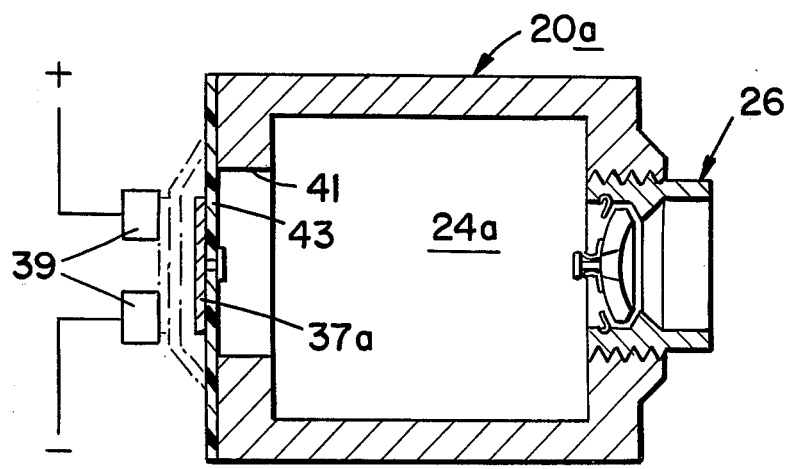
FIG_13

PRESSURE MONITORING DEVICE

This application is a continuation-in-part of application Ser. No. 462,081 filed Apr. 18, 1974, now abandoned.

BACKGROUND OF THE INVENTION

This invention relates to a pressure responsive actuator device and particularly one which operates automatically in response to a reduction in fluid pressure which surrounds it within a confined space.

In various types of apparatus and devices it is necessary to detect a drop in pressure within a confined space and provide a signal or indication of the pressure drop. For example, in vehicle tires which are normally inflated to a predetermined pressure, it is desirable to sense when that pressure decreases due to the development of a leak in the tire. In such an application it is also desirable to provide a pressure sensor that requires a minimum of calibration. Heretofore, pressure responsive actuators utilized diaphragms, springs and other mechanical parts yieldable to pressure. Considerable manufacturing precision and close tolerances were required for such parts in order to calibrate the sensor for use at certain pressure levels. This often contributed to an excessive unit cost or a lower level of reliability. For example, one common form of pressure responsive switch utilized a spring biased piston in a chamber, the piston being forced by the spring to move and close electrical contacts when pressure in the chamber was reduced. Such an arrangement required a multiplicity of precision made parts in order to provide an acceptable level of reliability and accuracy. In view of these difficulties a need arose for an improved actuator of greater simplicity and reliability

SUMMARY OF THE INVENTION

A general object of the present invention is to provide an improved actuator responsive to pressure changes in a confined space that surrounds the actuator.

Another object of my invention is to provide a pressure responsive actuator which automatically sets itself as pressure is increased in a confined space to a predetermined level so that the actuator will operate automatically if, thereafter, the pressure should decrease from the predetermined level.

Another object of my invention is to provide a pressure responsive actuator device that is relatively simple in structure, has few moving parts and is particularly well adapted for ease and economy of manufacture.

A further more specific object of my invention is to provide a pressure responsive actuator which forms a relatively small chamber having an inlet with a check valve which receives fluid under pressure but prevents it from escaping and a movable portion on the wall of the chamber which automatically extends when the surrounding air pressure outside the chamber is reduced.

Yet another object of my invention is to provide an actuator device that is responsive to a decrease in pressure of fluid media surrounding the device to operate an electrical circuit.

The aforesaid objects are accomplished in one form of the invention by a small, hollow tank or vessel capable of holding a fluid under pressure. The tank or vessel is made of material strong enough to allow relatively thin walls, and it is completely closed except for an inlet valve and possibly a relief valve. The inlet valve is essentially a check valve, allowing fluid to flow into the chamber but preventing any flow out. The relief valve, if used, may be made to operate whenever the pressure inside the chamber exceeds the outside pressure by a preselected amount. At one end of the tank is a movable wall portion such as one with bellows-like folds which are normally retracted or compressed or an expandable diaphragm section or a movable piston. The size of this wall portion is such that it will commence to extend whenever the pressure within the chamber exceeds the outside pressure. This extended wall of the tank or vessel can be made to contact an electrical terminal to actuate a transmitter or some form of circuit or mechanism. For example, the device may be used within a tire to actuate a transmitter and thereby provide a tire warning system.

Other objects, advantages and features of my invention will become apparent from the following detailed description of one embodiment thereof, presented in conjunction with the accompanying drawings.

BRIEF DESCRIPTION OF DRAWING

FIG. 1 shows a view in elevation of an actuator device embodying the principles of the present invention, with portions broken away;

FIG. 2 is an end view taken along line 2—2 of FIG. 1;

FIG. 3 is an end view taken along line 3—3 of FIG. 1;

FIG. 4 is a view in elevation showing a typical installation of my device for closing an electrical switch;

FIG. 5 is a enlarged view in section showing a combined inlet and relief valve for my device;

FIG. 5a is a plan view of the retaining spring for the inlet check valve;

FIG. 6 is a view similar to FIG. 5 showing the relief valve in the open position;

FIG. 6a is a plan view of the retaining spring for the relief valve;

FIG. 7 is another embodiment of my device utilizing a shield for the movable actuator in the retracted position;

FIGS. 8–12 are a series of views illustrating a typical sequence of operations for the actuator device according to the present invention;

FIG. 13 is a view in elevation of another form of actuator according to my invention utilizing a flexible diaphragm as the movable wall;

FIG. 14 is a view in elevation of another form of actuator utilizing a diaphragm with different construction; and FIG. 15 is a view in elevation showing yet another form of my actuator utilizing a movable piston.

Referring to the drawing, FIGS. 1 – 3 show one form of an actuator device 20 according to the present invention as it appears in its inactive state. Generally, it comprises a relatively thin-walled tank or vessel 22 which forms a chamber 24 and may be formed from any suitable material. For example, any of the well known polymeric plastics may be used which are light but strong and durable and easily manufactured in quantity by conventional molding techniques. At one end of the tank is a valve 26 which allows for the flow of surrounding air or fluid into the chamber 24. This valve, as will be described later with reference to FIGS. 5 and 6 also includes a relief valve to allow excessive pressure within the chamber to be relieved when that condition occurs. At the other end of the tank 22 is necked down portion 28 to which is attached a movable or extendable wall portion 30. The latter may be made of a somewhat different material and therefore is preferably made as a separate component and then attached to the necked down portion of the tank as by the threads 32, as shown. In this embodiment, the end wall portion 30 may be made of a flexible or semi-flexible plastic material and is comprised of a series of undulating annular bellows-like folds 34 attached to a circular plate 36 and its outer end. Normally, the folds 34 are tightly compressed together when the wall portion 30 is in its deactivated or retracted position, but when the pressure inside the tank increases over that which surrounds it, the folds separate and the plate 36 is extended outwardly.

As shown in FIG. 4, in a typical installation, the actuator 20 may be secured to some supporting structure 38 so that its end plate 36, having a surface layer 37 of conductive material, is aligned with a pair of electrical terminals 39 of a switch 40. The layer 37 may be aluminum paint, gold leaf paint or any other suitable conductive material. The switch may be a part of any electrical circuit which is shown typically as including a power source (battery) 42 and a load 44. As a pressure differential occurs between the inside and outside of the tank, the plate 36 is extended and its conductive layer 37 closes the switch terminals 40 to energize the circuit.

Other forms of movable or extendable end wall structures embodying the invention are illustrated in FIGS. 13 – 15. FIG. 13 shows an actuator 20a having a chamber 24a formed by rigid plastic or metal material and having a combined inlet check and relief valve 26 that is threaded into one end thereof. At the other end of the chamber is a wall with an opening 41 covering by a diaphragm 43 of a suitable elastomeric, non-conductive material. Fixed to the diaphragm is a conductive plate 37a which functions to complete a circuit between two electrical contacts 39 when the diaphragm extends as the actuator is activated due to a decrease in outside pressure. FIG. 14 shows another actuator 20b according to my invention with an inlet check and relief valve 26 at one end and a movable or extendable wall 30b at its other end having yet another construction. Here, an annular member 45 of plastic material is threaded to a rigid valve body forming a chamber 24b at the opposite end thereof from the check and relief valve. The annular member 45 has a thinner and flexible diaphragm portion 47 that is integral therewith and has a generally flat outer surface. A conductive layer or plate 37b is fixed to the latter surface, and as shown by the phantom lines, a reduction in fluid pressure outside of the actuator causes the diaphragm to extend and close an electrical circuit between two contacts 39.

In FIG. 15, still another modified form of actuator 20c is shown wherein a chamber 24c is again formed from a rigid metal or plastic, with a check and relief valve 26 at one end. Here, the movable wall at the other end of the chamber is a piston 51 having an enlarged end portion 53 that is slidable within the chamber 24c. A spring 55 within the chamber is positioned to bear against the enlarged end portion and thereby bias the piston to its closed position. The piston is preferably made of a non-conductive plastic material but it has a conductive layer or plate 37c on its outer end surface so that it can operate to close contacts of an electrical circuit, as previously described.

Other ways of utilizing the extension of the movable end wall in the form of the folds 34 or the movable piston 51 to provide a switching, activation or response means are also contemplated within the scope of the invention. For example, the folds 34 or piston 51 may be coated with a material that reacts in some way to a beam or ray of light or electromagnetic energy that is directed toward the actuator, as will be described later.

The combined inlet and relief valve 26 appears in its two principle operating positions in FIGS. 5 and 6. In the typical valve construction shown, an outer circular valve body 50 which serves as an inlet check valve is provided having a conical outer edge face 52. This face is adapted to bear against a similarly conical surface forming a valve seat 54 in the annular lip 56 of an opening in the end of the thin walled vessel 22. The valve body 50 is urged against the seat 54 by a retaining spring 58, as shown in FIG. 5a, which has a circular portion 59 with a curved back cross section that is retained by a groove in an outer lip 60 around the vessel opening. Extending radially inwardly from the circular portion of the circular spring portion 59 are a series of circumferentially spaced apart fingers 62 that press against the inner surface 61 of the valve body 50. When the pressure inside the vessel 22 is less than the outside pressure the valve body 50 is forced against the yieldable fingers 62 and an opening 63 is formed between edge 52 of the valve body and the valve set 54 to allow air to enter the vessel chamber 24. When the pressure within the vessel is equalized with the outside pressure, the spring fingers 62 keep the valve body 50 closed against the seat 54.

Within a centrally located opening 64 in the valve body 50 is a secondary relief valve member 66 having a circular inner portion 68 with a conical surface 70 that is adapted to fit flush against a similarly conical surface forming a valve seat in the opening 64. The inner valve portion 68 is connected by a neck 72 with an outer, button-like portion 74. Another circular spring 76, as shown in FIG. 6a, is located around the secondary valve member with an outer ring portion 77 bearing against the valve body 50 around the opening 64. Finger-like portions 78 extend radially inwardly from the ring portion of the spring 76 and have curved inner ends 79 that fit under the outer, button-like valve portion 74, thereby normally urging the inner portion 68 of the secondary valve member toward its closed position. When the pressure within the vessel chamber 24 exceeds the pressure outside of the vessel by some predetermined amount (e.g. 5 psi), the secondary valve member 66 will be forced outwardly against the spring 76 and thereby allow air to flow through the opening 64, as shown in FIG. 6.

It should be understood that the foregoing describes one typical valve structure particularly adaptable for use with my actuator vessel. However, other such inlet and relief valve structures or mechanism may be used and the valves may be combined as shown in FIGS. 5 and 6 or they may be installed as separate valves (see FIG. 1).

The operation of my actuator device 20 in a typical installation such as, for example, in a tire pressure monitoring system, may be described with reference to the schematic FIGS. 8 – 12 of the drawing. Here, an actuator device 20a is shown with inlet and relief valves 50a and 66a represented separately and schematically for purposes of illustration. FIG. 8, shows the actuator device as it would appear when installed within a space or an outer tank to be pressurized, such as a tire, with its extendable end portion 30a in the retracted position. Assuming that there is initially low or atmospheric pressure within the vessel 22a, when pressure is introduced to the outer tank (e.g. 30 psi), the inlet valve 50a is forced open and the pressure within the vessel also raises to the same level. At this point, as shown in FIG. 9, with the pressure inside and outside the vessel equal, both valves 50a and 66a are closed. This would be the case when a tire is in normal use with no leaks. Now, assume, as shown in FIG. 10, that the outer tank or tire loses pressure to a point below the original level (e.g. 29 psi). This creates a pressure differential between the inside and outside of the vessel 22a causing the extendable end portion of the actuator to move by opening its bellows-like folds 34a. When this occurs, the actuator may trigger, by some suitable means, as shown in FIG. 4, an alarm system. If the pressure in the outer tank continues to fall until it is below the pressure within the vessel by some predetermined amount (e.g. 5 psi), the relief valve 50a will be forced open and prevent excessive stress on the vessel. However, during this relief valve action the movable part of the actuactor will remain in its extended position, as shown in FIGS. 11 and 12, and once the pressure differential falls below the set amount (e.g. 5 psi), the relief valve 66a will close.

Thus, it is seen that in accordance with the present invention the actuator device 20 is automatically set for operation as the outer tank (or tire) is pressurized to its normal level. This is an important advantage because it eliminates the necessity of presetting a valve to actuate at a predetermined pressure level or amount of change. In prior pressure detection actuators, it was necessary to set the valve mechanism to trigger at the preselected pressure. With the present invention the valve sets itself automatically as the confined space which it is monitoring is brought up to the desired pressure level. Once this is done, as when a tire is initially inflated to its proper pressure, any decrease in tire pressure will cause the valve to operate. Thus, the present valve will operate for any tire, despite its normal inflation pressure and it is not necessary to adjust the valve to operate satisfactorily for different pressure levels.

As shown in FIG. 4, the actuator 20 may be used as a switch to control an electrical circuit. Another manner for utilizing its capabilities as an indicator or a passive actuator 20a is shown in FIG. 7. Here, the extendable folds 34 and the end wall 30, when retracted, are with the general confines of a shielding means such as an annular shroud 80 that is fixed to the vessel 22. Depending on the energy that the shroud is to deflect or shield against, its material may vary. For example, if it merely is to shield against light, a rigid plastic could be used, but if it is intended to shield R. F. energy a suitable metallic material would be used. The shroud has an opening 82 that is aligned with but only slightly larger than the extendable portion of the actuator. When the device 20a is inactive the folded extendable portion is within the shroud and shielded by it from any light or energy that may be beamed at the vessel. When the device becomes activated, the extendable portion 34 will project outwardly through the opening 82 in the shroud and be exposed. In doing so it may provide either a visual indication of a pressure change in the environment around the vessel or it may provide a reaction to some form of energy beamed at the vessel which reacts to the surface of the extended actuator portion 34.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An actuator device responsive to pressure variations in a fluid medium surrounding and external to the device, comprising:
   a vessel having wall means forming an enclosed chamber, said vessel being surrounded by the fluid medium;
   one-way inlet check valve means in the wall means for allowing fluid of the external fluid medium to flow into the chamber and including internal pressure responsive means for biasing the check valve means toward and holding it in a closed position when internal chamber pressure exceeds external medium pressure, so that the chamber assumes substantially the external medium pressure as the medium pressure rises, and retains the maximum medium pressure attained if the medium pressure drops;
   movable means connected to the wall means, biased toward a normally retracted position, for extending from the retracted position outwardly away from the wall means a predetermined limited distance in response to a decrease in pressure of the external fluid medium; and
   a relief valve in the wall means for allowing fluid to escape from the vessel whenever the pressure in the chamber exceeds the external medium pressure by a predetermined amount, said relief valve being operable in response to said predetermined amount of pressure differential independently of said movable means.

2. The device as described in claim 1 wherein said movable means comprises a secondary wall member attached to said vessel and comprising a series of folded portions connected to an end portion and adapted to extend due to increased pressure within the vessel.

3. The device as described in claim 2 wherein said secondary wall member has an electrically conductive means on its surface for contacting and electrically connecting a pair of terminals when extended.

4. The device as described in claim 2 wherein said outer surface of said movable means has an exterior layer means that is sensitive to an external beam of energy, and annular shield means fixed to said vessel capable of preventing the passage of said energy normally surrounding said movable means in its retracted position, said shield means having an opening through which said movable means projects in its extended position to expose said layer means.

5. The device as described in claim 1 wherein said movable means comprises an extensible wall member forming part of said wall means.

6. The device as described in claim 1 wherein said movable means comprises a movable piston within said vessel and spring means normally biasing said piston toward a closed unextended position.

7. The device as described in claim 4 including electrically conductive means fixed to the outer end of said piston.

8. The device as described in claim 1 wherein said movable means comprises a flexible diaphragm fixed around its outer edges to one end of said vessel.

9. The device as described in claim 8 including a layer of an electrically conductive material on the outer surface of said diaphragm.

10. The device as described in claim 8 wherein said means inlet valve and said relief valve are combined in a single valve structure mounted within a single opening in the wall means of said vessel.

11. The device as described in claim 1 wherein said vessel is made of a relatively thinwalled plastic material having a generally elongated shape with said movable means being attached to one end of the vessel.

12. The device as described in claim 11 wherein said movably means is threadedly secured to said wall means of said vessel.

* * * * *